(12) United States Patent
Nitta et al.

(10) Patent No.: US 8,149,992 B2
(45) Date of Patent: Apr. 3, 2012

(54) X-RAY TUBE TARGET, X-RAY TUBE USING THE SAME, X-RAY INSPECTION DEVICE AND METHOD OF PRODUCING X-RAY TUBE TARGET

(75) Inventors: Akihisa Nitta, Yokohama (JP); Shinichi Yamamoto, Fujisawa (JP); Hiromichi Horie, Yokosuka (JP)

(73) Assignees: Kabushiki Kaisha Toshiba (JP); Toshiba Materials Co., Ltd. (JP)

( * ) Notice: Subject to any disclaimer, the term of this patent is extended or adjusted under 35 U.S.C. 154(b) by 0 days.

(21) Appl. No.: 12/985,631

(22) Filed: Jan. 6, 2011

(65) Prior Publication Data
US 2011/0103553 A1 May 5, 2011

Related U.S. Application Data

(63) Continuation of application No. PCT/JP2009/062385, filed on Jul. 7, 2009.

(30) Foreign Application Priority Data

Jul. 9, 2008 (JP) ................................. 2008-179011

(51) Int. Cl.
*H01J 35/10* (2006.01)

(52) U.S. Cl. ........................................ 378/143; 378/144
(58) Field of Classification Search .................. 378/144, 378/143, 119, 125, 128
See application file for complete search history.

(56) References Cited

U.S. PATENT DOCUMENTS

| 5,102,747 A | 4/1992 | Kneringer |
| 7,762,448 B2 | 7/2010 | Rödhammer |
| 2009/0290685 A1* | 11/2009 | Aoyama et al. ................ 378/144 |
| 2010/0266102 A1* | 10/2010 | Lee et al. ..................... 378/127 |

FOREIGN PATENT DOCUMENTS

| JP | 3040203 | 3/2000 |
| JP | 2007-512959 | 5/2007 |

* cited by examiner

*Primary Examiner* — Hoon Song
(74) *Attorney, Agent, or Firm* — Harness, Dickey & Pierce, P.L.C.

(57) ABSTRACT

According to one embodiment, there is provided an X-ray tube target. The X-ray tube target has a structure in which a carbon base material is bonded with an Mo base material or Mo alloy base material with a joint layer. The joint layer includes an MoNbTi diffusion phase, an NbTi alloy phase, an Nb-rich phase and a ZrNb alloy phase when the ratios of components in the joint layer are detected by EPMA.

17 Claims, 2 Drawing Sheets

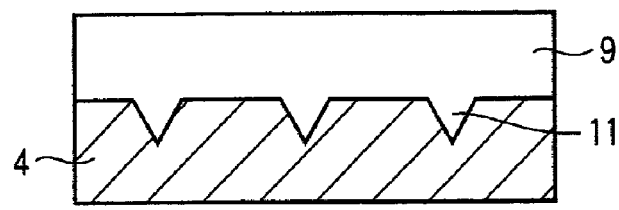
F I G. 4
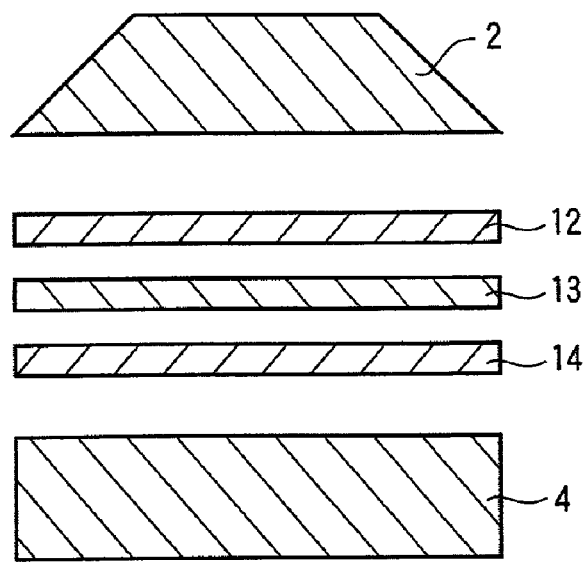
F I G. 5
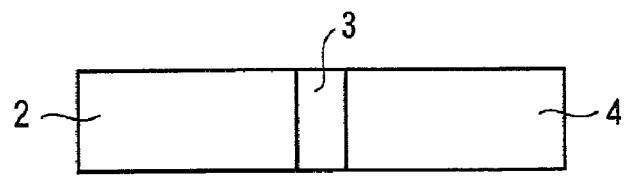
F I G. 6

X-RAY TUBE TARGET, X-RAY TUBE USING THE SAME, X-RAY INSPECTION DEVICE AND METHOD OF PRODUCING X-RAY TUBE TARGET

CROSS REFERENCE TO RELATED APPLICATIONS

This is a Continuation Application of PCT Application No. PCT/JP2009/062385, filed Jul. 7, 2009, which was published under PCT Article 21(2) in Japanese.

This application is based upon and claims the benefit of priority from Japanese Patent Application No. 2008-179011, filed Jul. 9, 2008; the entire contents of which are incorporated herein by reference.

FIELD

Embodiments described herein relate generally to an X-ray tube target having excellent high-temperature strength, an X-ray tube using the target, an X-ray inspection device and a method of producing an X-ray tube target.

BACKGROUND

X-ray tubes are used in various X-ray inspection devices such as an X-ray CT device which captures the condition of the internal structure of subjects such as a human body utilizing the transmission power of X-rays, an X-ray fluoroscope and nondestructive inspection analyzers for detecting defects inside a structure and the inside of a case (for example, baggage inspection systems).

Each of these X-ray inspection devices includes an X-ray tube which generates X-rays and an X-ray detection section provided with a scintillator (including an image intensifier tube) that detects X-rays transmitted through a subject.

The X-ray tube is generally provided with a pair cathode and anode arranged so as to face each other in a container made of a glass bulb, metal or ceramics. The cathode is constituted of, for example, tungsten filaments. Also, the anode is constituted of a target made of tungsten (W), molybdenum (Mo) or an alloy thereof. With regard to the principle of the function of this X-ray tube, electrons are emitted by heating the tungsten filaments of the cathode and accelerated by the voltage applied across the anode and cathode. These electrons then collide with a target which is the anode, as an electron beam having kinetic energy, with the result that X-rays are emitted in a predetermined direction from the target.

In recent years, X-ray CT devices, X-ray fluoroscopes and nondestructive examination analyzers are desired to have improved resolution associated with a highly precise X-ray image and to shorten the time required for obtaining a moving image and for inspection. In order to improve the resolution of X-ray CT devices, it is necessary that each individual X-ray scintillator to be used in the X-ray detection sections be small-sized and many of them be arranged in the same detection area. However, if these X-ray scintillators are small-sized, X-ray detection sensitivity to the same X-ray incident energy per unit area is reduced. This reduction in sensitivity can be compensated by more increasing the output of X-rays from the X-ray tube. Also, the reduction in the time required for obtaining a moving image and for inspection can be attained by more increasing the output of X-rays from the X-ray tube. From the reason mentioned above, there is a need for a high-output X-ray tube which can generate X-rays stronger than a conventional X-ray tube and therefore, high-output X-ray tubes are being developed and put to practical use.

Generally, it is necessary to increase the kinetic energy of electrons which collide with a target to increase the output of X-rays of the X-ray tube. However, a part of the kinetic energy of electrons acts as thermal energy to raise the temperature of the part where electrons collide with the target, with the result that melting of the target itself and the rise in temperature cause deteriorations in the metal phase of the target.

For this, many high-output X-ray tubes adopt a structure in which an axially symmetric rotating body (for example, a disk shape) is used as the target and the rotating body is rotated at a speed as high as 2000 rpm to 10000 rpm with respect to an electron beam to thereby always vary the focal plane of the target which receives electron beam radiation, thereby preventing a local rise in temperature. X-ray tubes having such a target are called rotating anode (target) X-ray tubes.

There are following methods used to develop such a rotating anode X-ray tube having a higher output: (1) a method in which the rotating speed of the target is more increased to thereby improve cooling efficiency and further, the kinetic energy of the electron beam which collides with the target is increased and (2) a method in which the target is large-sized to thereby widen the area with which the electron beam collides.

Emission from the X-ray tubes of X-ray CT devices and X-ray inspection devices is not continuous but these X-ray tubes each have idle time (time during which no energy is input into the target) during which no X-ray is emitted till the next inspection since one CT inspection or one nondestructive inspection is finished. For this, the heat capacity of the whole target is designed to have a large value, thereby making it possible to drop the maximum temperature of the target when X-rays are applied and also to raise the average temperature of the target and it is therefore possible to deal with high output of the X-ray tube. When the heat capacity of the whole target is increased, the mass of the target is desirably as small as possible because the target is a rotating body. The part with which the electron beam collides on the targets needs W, Mo or an alloy thereof as mentioned above. However, when W, Mo or an alloy thereof which has a large density and a small specific heat is only used to constitute the target, their mass is excessively large and therefore, this is undesirable. Therefore, in order to provide a large heat capacity and to limit an increase in the target weight, it is desirable to use carbon which is a material having no problem concerning mechanical strength under high temperature and a large specific heat by joining the carbon with W, Mo or an alloy thereof.

Also, though a method is considered in which the size of the target of W, Mo or an alloy thereof is more increased to enlarge the area of radiation as the method of attaining an X-ray tube target of a high-output X-ray tube, this method requires a structure taking the aforementioned rotating body stiffness standing to high rotation into consideration and large increases in the weight and dimension of the X-ray tube including a bearing. Moreover, when the target is used for a CT device showing a trend toward high-speed scanning, it is necessary to rotate the whole X-ray tube of the CT device at the CT scanning speed, and therefore the formation of the structure enough to stand to large centrifugal force is accompanied by a large difficulty.

A light-weight target can be attained if an X-ray tube formed by joining W, Mo with carbon as mentioned above is used. Such an X-ray tube target is reported in Patent Documents 1 and 2. Patent Document 1 discloses the use of V (vanadium) as a solder. In Patent Document 2, a method in which a metal base material is coated with a solder in advance by a sputtering method and then joined with a material is used.

PRIOR ART DOCUMENT

Patent Document

Patent Document 1: Japanese Patent No. 3040203
Patent Document 2: Jpn. PCT National Publication No. 2007-512959

BRIEF DESCRIPTION OF THE DRAWINGS

FIG. 4 is a sectional view showing an example of a graphite base material formed with concave parts according to the present invention;
FIG. 5 is a view showing an example of a production method according to the present invention;
and
FIG. 6 is a view showing an example of a test piece.

DETAILED DESCRIPTION

Figure 1:
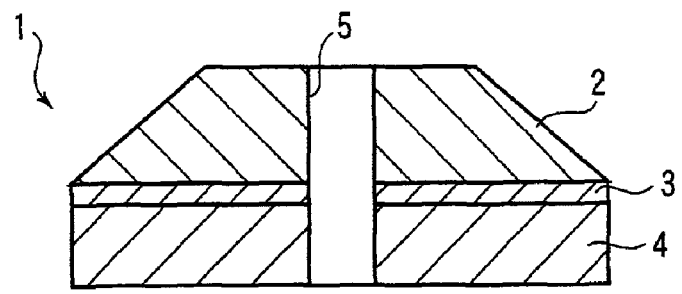
FIG. 1 is a sectional view of showing an example of an X-ray tube target according to the present invention.

An X-ray tube target having high bonding strength under high temperature is obtained by using the methods of Patent Documents 1 and 2. However, the solder using vanadium as described in Patent Document 1 entails high production cost because vanadium is very expensive. Moreover, vanadium is a burden on human bodies and environment because it is toxic. Also, the method described in Patent Document 2 requires complicated production control and hence high production cost because the sputtering method is used in a solder-bonding operation. It has been therefore required to develop an X-ray tube target which can simplify production processes and is superior in bonding strength under high temperature.

It is an object of an embodiment of the present invention is to solve the above problems and to provide an X-ray tube target by using an economical bonding method improving bonding strength under high temperature, a method of producing the X-ray tube target, an X-ray tube and an X-ray inspection device.

In general, according to one embodiment, there is provided an X-ray tube target. The X-ray tube target has a structure in which a carbon base material is bonded with an Mo base material or Mo alloy base material with a joint layer disposed therebetween. The joint layer includes an MoNbTi diffusion phase, an NbTi alloy phase, an Nb-rich phase and a ZrNb alloy phase when the ratios of components in the joint layer are detected by EPMA.

The MoNbTi diffusion phase preferably comprises an MoNbTi solid solution. The NbTi alloy phase preferably comprises 10% by mass (including 0) or less of Mo. Further, the Nb-rich phase preferably comprises 90% by mass or more of Nb. Furthermore, the ZrNb alloy phase preferably includes a ZrC phase.

The thickness of the joint layer preferably falls within a range of 20 to 2000 μm. The thickness of the MoNbTi diffusion phase preferably falls within a range of 1 to 100 μm, the thickness of the NbTi alloy phase preferably falls within a range of 10 to 500 μm, the thickness of the Nb-rich phase preferably falls within a range of 1 to 600 μm, and the rest of the thickness of the joint layer is preferably the thickness of the ZrNb alloy phase. Further, a concave part is preferably formed on the carbon base material at the contact plane between the carbon base material and the joint layer. Such X-ray tube target is optimal for X-ray tube and X-ray inspection device.

Further, according to the embodiment of the present invention, there is provided a method of producing an X-ray tube target having a structure in which a carbon base material is bonded with an Mo base material or Mo alloy base material with a joint layer disposed therebetween. The method comprises the steps of; producing a first solder layer comprising an NbTi alloy, a second solder layer comprising Nb or an Nb alloy and a third solder layer comprising Zr between the carbon base material and the Mo base material or Mo alloy base material; and bonding these materials at a temperature falling within a range of 1730 to 1900° C. The boding step is preferably carried out at a temperature falling within a range of 1730 to 1860° C. The boding step is preferably carried out with applying a pressure falling within a range of 1 to 200 kPa. Further, the boding step is preferably carried out under vacuum or in non-oxidizing atmosphere. The first solder layer, the second solder layer and the third solder layer are preferably each a foil.

An X-ray tube target according to the present invention has a structure in which a carbon base material is bonded with an Mo base material or Mo-alloy base material with a joint layer being interposed therebetween. FIG. 1 is a sectional view showing an example of an X-ray tube target. In FIG. 1, the symbol 1 represents an X-ray tube target, the symbol 2 represents an Mo base material (or an Mo alloy base material), the symbol 3 represents a joint layer, the symbol 4 represents a carbon base material and the symbol 5 represents a hole part for inserting a rotating shaft.

The Mo (molybdenum) base material 2 is a member which works as a plane irradiated with electron rays. Since Mo has a high specific gravity, the target is heavy when the X-ray tube target is formed of the Mo base material and it is necessary to reinforce the support tool (rotating shaft), rotating mechanism (motor) and the like for attaining high-speed rotation. It is therefore important to replace a part of the target with the carbon base material 4. Examples of the Mo alloy include Mo alloys containing Ti or Zr in a total amount of 0.2 to 10% by mass though no particular limitation is imposed on the Mo alloy insofar as it has high-temperature strength, or include Mo alloys containing any one type of metals such as Ti, Zr, Hf, La, Ta, Y, Nb, W and Re in the form of a single metal, oxide or carbide in an amount of 0.2 to 10% by mass. W (tungsten) or Re—W alloy (rhenium-tungsten alloy) may be formed on the plane irradiated with electron rays according to the need. Examples of the carbon base material include graphite base materials.

In order to attain compatibility between reduction in the weight of the X-ray tube target and bonding strength under high temperature, it is necessary to dispose the joint layer 3 that bonds the Mo base material 2 firmly with the carbon base material 4. The characteristic feature of the present invention is that the joint layer comprises an MoNbTi diffusion phase, an NbTi alloy phase, an Nb-rich phase and a ZrNb alloy phase when the ratios of ingredients in the joint layer are detected by EPMA.

The reason why EPMA is used in the present invention is that EPMA enables plane analysis in micro-areas, which is scarcely attained by chemical analysis. Specifically, first the joint layer is cut in the direction of the thickness and abraded by a diamond or the like such that the surface roughness (Ra) of the section is 1 μm or less. Then, the section is measured by EPMA to carry out qualitative and quantitative analysis. When this qualitative and quantitative analysis is carried out, it is necessary to define the boundary of each phase by utilizing the color mapping of EPMA to make mapping of each element.

Figure 2:
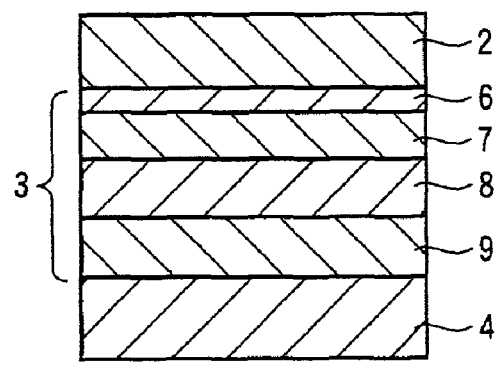
FIG. 2 is a sectional view showing an example of a joint layer according to the present invention.

FIG. 2 shows an example of the joint layer of the present invention. In FIG. 2, the symbol 2 represents an Mo base material, the symbol 3 represents a joint layer, the symbol 4 represents a carbon base material, the symbol 6 represents an MoNbTi diffusion phase, the symbol 7 represents an NbTi alloy phase, the symbol 8 represents an Nb-rich phase and the symbol 9 represents a ZrNb alloy phase.

The joint layer of the present invention includes, as essential components, Nb (niobium), Ti (titanium) and Zr (zirconium). Generally, strong bonding is obtained between Zr and carbon whereas Zr and Mo form an eutectic alloy having a low melting point. If an eutectic alloy having a low melting point exists, bonding strength under high temperature is decreased. In order to prevent the formation of such a ZrMo eutectic alloy, Nb is desirably disposed between Zr and Mo. Even if Nb is alloyed with Mo, the melting point is not dropped and therefore such a structure is effective for preventing the diffusion of Zr.

Generally, when Nb and Mo are bonded with each other, it is necessary to heat the both to a temperature not lower than the melting point (2468° C.) of Nb to form a liquid phase. However, the mechanical strength of the Mo base material is significantly dropped at such a temperature, bringing about deterioration in the quality required for products. In light of this, an NbTi alloy is used in the present invention to solve this problem. Specifically, the NbTi alloy takes the form of solid solution having an optional melting point between the melting point of Nb (2468° C.) and the melting point of Ti (1668° C.) by controlling the composition ratio of Nb to Ti. Accordingly, NbTi alloys having a melting point in a temperature range where the mechanical strength of the Mo base material is not likely to be dropped can be produced. Also, Ti is energetically more stable in the state of a solid solution containing oxygen than in the state of an oxide under high temperature, and therefore, oxygen on the joint surface is incorporated into Ti, with the result that a purified surface suitable to bonding can be obtained.

From the foregoing reason, the joint layer of the present invention comprises Nb (niobium), Ti (titanium) and Zr (zirconium) as essential components. Each phase will be explained below.

The MoNbTi diffusion phase is a phase obtained by mutual diffusion of Mo of the Mo base material and the NbTi alloy used as the solder and forms a solid solution having a bcc crystal structure. Also, the content of Mo in the diffusion phase exceeds 10% by mass. The thickness of the MoNbTi diffusion phase preferably falls within a range of 1 to 100 μm and more preferably 5 to 50 μm. For example, a solid solution, an NbTi alloy phase in which Mo is diffused, can be formed by using, for example, the production method which will be explained later.

Although the MoNbTi diffusion phase is desirably formed as a continuous layer on the Mo base material, it is only required that the diffusion phase is formed on 80% or more to 100% or less of the surface area of the Mo base material. When the thickness of the MoNbTi diffusion phase is less than 1 μm, this leads to easy generation of a part where the diffusion phase is not formed (the area ratio tends to be less than 10%). On the other hand, when the thickness of the MoNbTi diffusion phase exceeds 100 μm, not only the effect of improving the bonding strength under high temperature is saturated but also the thickness is largely varied and there is therefore the possibility that the bonding strength is dropped.

Also, the NbTi alloy phase means a phase in which the content of Ti is 10% by mass or more to 50% by mass or less and the content of Mo (including 0) is 10% by mass or less, which is balanced with Nb. As mentioned above, the NbTi alloy phase forms a solid solution of Nb and Ti.

The thickness of the NbTi alloy phase may be from 10 to 500 μm and preferably 30 to 300 μm. When the thickness is less than 10 μm, there is the possibility that a discontinuous layer part is formed. When the thickness of the NbTi alloy phase exceeds 300 μm on the other hand, the effect produced by the formation of the NbTi alloy phase is saturated. Also, the aforementioned effect of cleaning the surface of a solder can be obtained because Ti can incorporate oxygen on the surface of the solder thereinto. For this, the NbTi alloy phase is preferably a continuous layer.

The Nb-rich phase means a phase comprising 90% by mass to 100% by mass of Nb. Ti may be contained in an amount of 10% by mass or less (including 0) and Zr may be contained in an amount of 1% by mass or less (including 0) as components other than Nb in the Nb-rich phase. The existence of a region in which the content of Ti is 10% by mass or less (including 0) can prevent Zr from diffusing in an amount higher than a necessary amount from the ZrNb alloy phase which will be explained later. When the Zr is prevented from diffusing in an amount higher than a necessary amount, the production of an MoZr eutectic alloy having a low melting point can be prevented. Also, the thickness of the Nb-rich phase preferably falls within a range of 1 to 600 μm. When the thickness of the Nb-rich phase is less than 1 μm, the diffusion preventive effect of Zr may lack. When the thickness of the Nb-rich phase exceeds 600 μm, the effect of preventing the diffusion of Zr is not improved. The thickness of the Nb-rich phase more preferably falls within a range of 30 to 400 μm.

Figure 3:
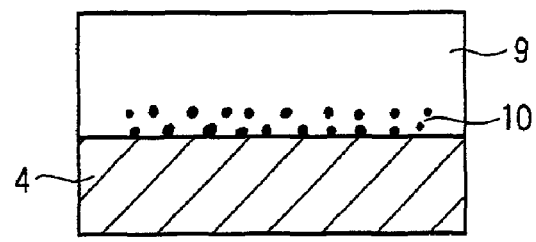
FIG. 3 is a sectional view showing another example of a joint layer according to the present invention.

The ZrNb alloy phase means a Zr phase comprising Nb. This ZrNb alloy phase is preferably a phase formed by mutual diffusion of Zr and Nb. Also, there is the case where in this ZrNb alloy phase, Zr reacts with carbon to form a ZrC phase. Also, because the ZrC phase is fine precipitates (precipitation of microparticles) resulting from a reaction between Zr and C and has the effect of improving the mechanical strength of the ZrNb alloy phase by dispersing these fine precipitates in the ZnNb alloy phase, the bonding strength under high temperature can be further improved. Also, the ZrNb alloy phase preferably has a continuous layer-like form. Also, as shown in FIG. 3 (the symbol 9 is the ZrNb alloy phase and the symbol 10 is the ZrC phase in FIG. 3), the ZrC phase is preferably in the state dispersed finely in the ZrNb alloy phase. If the ZrC phase exists in an amount of 0.1 to several % (ratio by volume) in the ZrNb alloy phase, the effect of the ZrC phase is obtained sufficiently.

The total thickness of the joint layer mentioned above falls within a range of preferably 20 to 2000 μm. In this case, the above total thickness of the joint layer means sum of the thicknesses of the MoNbTi diffusion phase to the ZrNb alloy phase (including the ZrC phase if the ZrC phase exists). When the thickness of the joint layer is not uniform (for example, in the case of forming a concave part on the joint plane which will be explained later), the shortest distance is defined as the thickness of the joint layer.

The provision of a joint layer of the type stated above ensures that an X-ray tube target having high boding strength under high temperature can be obtained without using expensive and highly toxic vanadium or the like. Moreover, this production method has simple process, making it possible to reduce production costs.

Also, it is also effective to form concave parts in the carbon base material at the contact surface with the joint layer in order to enhance the bonding strength more. FIG. 4 shows an example including the concave part. In FIG. 4, the symbol 4 represents a carbon base material, the symbol 9 represents a ZrNb alloy phase and the symbol 11 represents a concave part. An anchor effect is obtained by the formation of the concave part. The sectional form of the concave part is not limited to the V-shape shown in FIG. 4 and examples of the sectional form of the concave part include a concave-shape and U-shape. Also, any of a dot form, vertical groove, horizontal groove, lattice form, circular form, polygonal form and spiral form may be selected as the form of the concave part without any particular limitation. Also, the concave part is formed on the graphite base material joint surface in an area of preferably 50% or more and more preferably 80% or more of the graphite base material joint surface. If the area ratio of the concave part to the graphite base material joint surface is less than 50%, the effect produced by the formation of the concave part may be small.

Because the X-ray tube target of the present invention is superior in bonding strength under high temperature, it is most suitably used when it is used for X-ray tubes in which the target is rotated at a speed as high as 2000 rpm or more and a little higher than 10000 rpm, for large targets having a diameter of 9 cm or more and for high-output X-ray tubes operated at an apply voltage as high as 100 kV or more. For this, the X-ray inspection device can be improved in reliability by using the X-ray tube target of the present invention.

Although no particular limitation is imposed on the production method insofar as the X-ray tube target of the present invention has the above structure, the following methods are given as methods for obtaining the X-ray tube target in an efficient manner.

First, as the solders, a first solder layer formed of an NbTi alloy, a second solder layer formed of Nb or an Nb alloy and a third solder layer formed of Zr are prepared. As a method of producing the first, second and third solder layers, there are, for example, a method in which a foil of each metal is installed and a method in which a powder of each metal is made into a paste which is then applied. Among these methods, the method in which a foil is installed is easy in view of handling. When, particularly, a large-sized target having a diameter of 9 cm or more is produced, it is more preferable to use a foil to obtain a continuous layer because a paste of a metal powder easily produces coating unevenness. FIG. 5 shows an example of a process of disposing a solder layer. In FIG. 5, the symbol 2 represents an Mo base material, the symbol 4 represents a carbon base material, the symbol 12 represents a first solder layer, the symbol 13 represents a second solder layer and the symbol 14 represents a third solder layer. A process of arranging each solder layer between the Mo base material and the carbon base material so as to obtain a laminate structure of Mo base material/first solder layer/second solder layer/third solder layer/carbon base material is carried out.

As to the composition ratio of the NbTi alloy in the first solder layer, the NbTi alloy contains Ti in an amount of 40 to 80% by mass which is balanced with Nb. If the ratio of Ti to Nb is in this range, the melting point can be designed to be 1730 to 1900° C. and therefore, the bonding temperature can be designed to be in a range from 1730 to 1900° C. Also, as the second solder layer, Nb or an Nb alloy is used. In the case of using only Nb, Nb having a purity of 99% or more (impurities: 1% by mass or less) is preferable. Also, as the third solder layer, Zr is used. The purity of Zr is preferably 98% or more (impurities such as Hf: 2% by mass or less).

Also, each thickness of the first, second, and third solder layers is preferably of the order larger by 20% than the thickness of the intended joint layer. The thickness of the first solder layer is preferably in a range from 0.02 to 0.2 mm, the thickness of the second solder layer is preferably in a range from 0.2 to 0.6 mm and the thickness of the third solder layer is preferably in a range from 0.1 to 0.3 mm. If, for example, the thickness of the first solder layer is too low, the production of the first solder layer is difficult and also, the composition of the joint layer after the bonding treatment largely varies. Also, when the second and third solder layers are each excessively thin, Zr diffuses into the joint layer, resulting in the formation of an MoZr eutectic phase. When this phase is formed, the bonding strength under high temperature is significantly decreased as mentioned above. Each solder layer having too thick carries a high risk that the solder put into a liquid phase in the bonding process leaks out of the target.

Next, a process of bonding the laminated components at a temperature of 1730 to 1900° C. is carried out. At this time, when the temperature is less than 1730° C., each solder layer is insufficiently put into a liquid phase. When the temperature exceeds 1900° C. on the other hand, there is the possibility that the mechanical strength of the Mo base material is significantly deteriorated. The temperature is more preferably 1730 to 1860° C. If the temperature is in a temperature range equal to or less than the melting point of Zr (1852° C.), there is a low risk as to leakage of Zr out of the target.

Also, in the case of bonding, it is desirable to carry out the bonding operation under a pressure of 1 to 200 kPa. The bonding strength can be improved by carrying out bonding under pressure. When the pressure is less than 1 kPa, the effect obtained by applying pressure is insufficient. When the pressure exceeds 200 kPa, there is a fear that the solder layer is put into a liquid phase in the bonding operation and leaks from the target. The pressure is more preferably 2 to 50 kPa.

Also, the bonding process is preferably carried out under vacuum or in a non-oxidizing atmosphere. The degree of vacuum is preferably $1 \times 10^{-2}$ Pa or less. Also, examples of the non-oxidizing atmosphere include a nitrogen or argon atmosphere, with argon atmosphere being preferable. Also, if the bonding process is carried out under vacuum or in a non-oxidizing atmosphere, the solder layer can be prevented from being oxidized more than necessary. Also, in the bonding process, it is also effective to carry out heat treatment as pretreatment in a hydrogen atmosphere. When the joint surface is exposed to a hydrogen atmosphere in this manner, adsorbed oxygen, oxides and the like which are bonding inhibitive factors can be eliminated, thereby making possible to further improve the bonding strength.

Also, the heating time for bonding is preferably 1 minute to 1 hour though depending on the above condition. As to the heating time, the temperature of the joint layer is preferably kept for 1 minute to 1 hour after it falls within ±10° C. of the intended bonding temperature.

Also, after the bonding operation is finished, post processes such as abrading of the side surfaces are carried out according to the need. Furthermore, when the target is incorporated into the X-ray tube, it is bonded with a rotating shaft prior to incorporation. The X-ray tube target of the present invention is suitable to a rotating anode X-ray tube and is superior in high-temperature strength. The X-ray tube target is, therefore, suitable to large targets having a rotating speed of 2000 rpm or more and a diameter of 9 cm or more or 12 cm or more, or high-speed, large-sized and high-output X-ray tubes operated at a voltage of 100 kV or more. Also, the X-ray tube of the present invention may be combined with a detector such as a scintillator to thereby obtain an X-ray inspection device. Also, because the X-ray tube can cope with high speed, large size and high output, the performance of the X-ray inspection device can be improved. The X-ray tube is suitable to, particularly, X-ray inspection devices for use in CT and fluoroscopes. CT (computerized tomography) is a detector capable of processing an image stereoscopically (three-dimensional image) and fluoroscopic inspection devices are detectors capable of obtaining a two-dimensional image in a shorter time than CT. In any of these detectors, a high-speed, large-sized and high-output X-ray tube is required.

The embodiments can provide an X-ray tube target superior in bonding strength under high temperature, a method of producing the X-ray tube target and an X-ray tube. Also, the embodiments can provide a highly reliable X-ray inspection device since the X-ray tube target is superior in bonding strength under high temperature. Also, in bonding production is free from the necessity of using an expensive and highly toxic material such as vanadium, is reduced in production cost and is also reduced in a burden on human bodies and environment. Also, because the bonding production is free from sputtering for film formation and therefore, a significant reduction in cost can be attained.

EXAMPLES

The embodiments of the present invention will be explained in detail by way of examples and comparative examples.

Example 1

A foil-shape solder layer was prepared, the solder layer including an NbTi alloy foil (Ti content: 45% by mass) 0.05 mm in thickness as a first solder layer, an Nb foil (purity: 99% by mass or more) 0.2 mm in thickness as a second solder layer and a Zr foil (purity: 98% by mass or more) 0.15 mm in thickness as a third solder layer.

These foils were laminated to obtain the structure: Mo base material/first solder layer/second solder layer/third solder layer/graphite base material, which were then bonded with each other under vacuum ($1 \times 10^{-2}$ Pa or less) in the following condition: 1860° C.×20 minutes and pressure to be applied: 10 kPa, to thereby manufacture an X-ray tube target according to Example 1. The diameter of the target was 10 cm and an Mo alloy base material containing 0.5% by mass of Ti and 0.08% by mass of Zr, with the balance made up of Mo was used as the Mo base material. Also, a groove having a V-shape in section was spirally formed on the joint surface side of the graphite base material in an area ratio of 80% or more.

The joint part of the obtained X-ray tube target was cut to expose the cross section thereof which was then abraded until the surface roughness Ra was 1 μm and then, the composition, thickness and the like of each phase of the section of the joint part were examined by EPMA color mapping. The results are shown in Table 2. In this case, JXA-8100 model (trade name, manufactured by JEOL Ltd.) was used as the EPMA device.

Examples 2 to 10

X-ray tube targets were respectively produced in the same manner as in Example 1 except that the thickness of the solder layer, alloy composition, bonding conditions and the like were changed to those shown in Table 1, and examined by EPMA in the same manner as in Example 1. The results are shown in Table 2.

Comparative Example 1

A 100 μm-thick Zr foil and an Mo base material were mounted on a graphite base material to bond these materials under vacuum ($1 \times 10^{-2}$ Pa or less) in the following condition: 1720° C.×5 minutes and pressure to be applied: 10 kPa.

Comparative Example 2

A laminate having a structure of Mo base material/0.07-mm-thick vanadium foil/0.3-mm-thick tungsten foil/0.1-mm-thick NbZr alloy foil (Nb: 20% by mass)/graphite base material was heated to bond under vacuum ($1 \times 10^{-4}$ Torr or less) in the following condition: 1700° C.×10 minutes and no pressure to be applied.

TABLE 1

| | Solder | | | | Bonding process | | |
|---|---|---|---|---|---|---|---|
| | NbTi alloy foil | | Nb foil | Zr foil | | | |
| | Composition (Ti wt %) | Thickness (μm) | Thickness (μm) | Thickness (mm) | Temperature (° C.) | Time (min) | Pressure (kPa) |
| Example 1 | 45 | 50 | 200 | 150 | 1860 | 20 | 10 |
| Example 2 | 45 | 50 | 250 | 150 | 1860 | 20 | 10 |
| Example 3 | 45 | 50 | 300 | 150 | 1860 | 20 | 10 |
| Example 4 | 60 | 50 | 200 | 150 | 1820 | 20 | 10 |
| Example 5 | 75 | 50 | 200 | 150 | 1780 | 20 | 10 |
| Example 6 | 45 | 100 | 500 | 200 | 1860 | 25 | 10 |
| Example 7 | 45 | 20 | 100 | 100 | 1860 | 25 | 13 |
| Example 8 | 45 | 100 | 450 | 350 | 1860 | 25 | 13 |
| Example 9 | 45 | 120 | 600 | 350 | 1860 | 30 | 13 |
| Example 10 | 45 | 150 | 1000 | 500 | 1860 | 40 | 15 |

TABLE 2

| | Joint phase | | | | | | |
|---|---|---|---|---|---|---|---|
| | MoNbTi diffusion phase | | NbTi alloy phase | Nb-rich phase | ZrNb alloy phase |
| | Thickness (μm) | Area ratio | Thickness (μm) | Thickness (μm) | Thickness (μm) |
| Example 1 | 20 | 82 | 201 | 35 | 199 |
| Example 2 | 22 | 85 | 209 | 88 | 189 |

TABLE 2-continued

| | Joint phase | | | | |
|---|---|---|---|---|---|
| | MoNbTi diffusion phase | | NbTi alloy phase | Nb-rich phase | ZrNb alloy phase |
| | Thickness (μm) | Area ratio | Thickness (μm) | Thickness (μm) | Thickness (μm) |
| Example 3 | 16 | 82 | 205 | 135 | 194 |
| Example 4 | 35 | 85 | 122 | 109 | 183 |
| Example 5 | 44 | 82 | 119 | 115 | 178 |
| Example 6 | 21 | 85 | 409 | 192 | 255 |
| Example 7 | 3 | 82 | 86 | 22 | 128 |
| Example 8 | 57 | 85 | 496 | 13 | 451 |
| Example 9 | 80 | 91 | 25 | 283 | 618 |
| Example 10 | 93 | 100 | 50 | 562 | 769 |

As is understood from Table 2, the joint layer of the X-ray tube target according to each example had a predetermined phase structure. Also, the MoNbTi diffusion phases of the examples were all solid solutions. Also, the NbTi alloy phase was a region containing 10% by mass or less of Mo. Also, the Nb-rich phase was a region containing 90% by mass or more of Nb (with the balance made up of 10% by mass of Ti and 1% by mass or less of Zr). Also, though a ZrC phase was present in each of the ZrNb alloy phases, the ratio of each ZrC phase was in a range from 0.2 to 2.1%.

Next, a test piece as shown in FIG. 6 was cut from each X-ray tube target according to Examples and Comparative Examples to measure the bending strength of the joint layer by the four-point bending method. At this time, the test piece was heated under vacuum from ambient temperature to a high-temperature range to measure bending strength at each temperature, thereby examining a heat resistant temperature of bonding, just before the strength sharply dropped. The results are shown in Table 3.

TABLE 3

| | Bonding heat resistant temperature (° C.) |
|---|---|
| Example 1 | 1522 |
| Example 2 | 1532 |
| Example 3 | 1540 |
| Example 4 | 1561 |
| Example 5 | 1577 |
| Example 6 | 1580 |
| Example 7 | 1578 |
| Example 8 | 1575 |
| Example 9 | 1576 |
| Example 10 | 1572 |
| Comparative Example 1 | 1355 |
| Comparative Example 2 | 1535 |

The high-temperature strength of the X-ray tube target according to each of these Examples is equal to or higher than that of the X-ray tube target of each of Comparative Examples. In short, the manufacturing cost can be significantly cut down because it is not essential to use expensive vanadium as having equivalent features.

Examples 11 to 13

The same ones as in Example 1 were manufactured except that there was the case where a concave part was formed on the graphite base material and the target size was changed. The high-temperature strength of each example was measured in the same manner as in Example 4. The results are shown in Table 4.

TABLE 4

| | Shape of the graphite joint surface | Target diameter (cm) | Bonding heat resistant temperature (° C.) |
|---|---|---|---|
| Example 11 | No concave part | 10 | 1558 |
| Example 12 | Formation of a spiral U-shape groove (area ratio: 90%) | 15 | 1560 |
| Example 13 | Formation of a double circle type concave groove (area ratio: 80%) | 20 | 1558 |

As is found from Table 4, a variation in high-temperature strength was decreased by 0 to −6% when no concave part was formed though a large improvement in high-temperature strength was not observed by forming the concave part. It was therefore found that the high-temperature strength could be efficiently improved in the case of forming the concave part. It was also found that the formation of the concave part made it possible to cope with a large-sized target.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An X-ray tube target having a structure in which a carbon base material is bonded with an Mo base material or Mo alloy base material with a joint layer disposed therebetween, wherein the joint layer comprises an MoNbTi diffusion phase, an NbTi alloy phase, an Nb-rich phase and a ZrNb alloy phase when the ratios of components in the joint layer are detected by EPMA.

2. The X-ray tube target according to claim 1, wherein the MoNbTi diffusion phase comprises an MoNbTi solid solution.

3. The X-ray tube target according to claim 1, wherein the NbTi alloy phase comprises 10% by mass (including 0) or less of Mo.

4. The X-ray tube target according to claim 1, wherein the Nb-rich phase comprises 90% by mass or more of Nb.

5. The X-ray tube target according to claim 1, wherein the joint layer comprises a ZrC phase dispersed in the ZrNb alloy phase.

6. The X-ray tube target according to claim 1, wherein a thickness of the joint layer falls within a range of 20 to 2000 μm.

7. The X-ray tube target according to claim 6, wherein a thickness of the MoNbTi diffusion phase falls within a range of 1 to 100 μm, a thickness of the NbTi alloy phase falls within a range of 10 to 500 μm, a thickness of the Nb-rich phase falls within a range of 1 to 600 μm, and a rest of a thickness of the joint layer is the thickness of the ZrNb alloy phase.

8. The X-ray tube target according to claim 1, wherein a concave part is formed on the carbon base material at a contact plane between the carbon base material and the joint layer.

9. An X-ray tube comprising the X-ray tube target according to claim 1.

10. The X-ray tube according to claim 9, wherein the X-ray tube target is a rotating anode.

11. An X-ray inspection device comprising the X-ray tube according to claim 9.

12. The X-ray inspection device according to claim 11, the inspection device is used for CTs or fluoroscopes.

13. A method of producing an X-ray tube target having a structure in which a carbon base material is bonded with an Mo base material or Mo alloy base material with a joint layer disposed therebetween, the method comprising;
   producing a first solder layer comprising an NbTi alloy, a second solder layer comprising Nb or an Nb alloy and a third solder layer comprising Zr between the carbon base material and the Mo base material or Mo alloy base material; and
   bonding these materials at a temperature falling within a range of 1730 to 1900° C.

14. The method of producing an X-ray tube target according to claim 13, wherein the boding is carried out at a temperature falling within a range of 1730 to 1860° C.

15. The method of producing an X-ray tube target according to claim 13, wherein the boding is carried out with applying a pressure falling within a range of 1 to 200 kPa.

16. The method of producing an X-ray tube target according to claim 13, wherein the boding is carried out under vacuum or in an inert gas atmosphere.

17. The method of producing an X-ray tube target according to claim 13, wherein the first solder layer, the second solder layer and the third solder layer are each a foil.

* * * * *